US009542482B1

(12) United States Patent
Sachan et al.

(10) Patent No.: US 9,542,482 B1
(45) Date of Patent: Jan. 10, 2017

(54) PROVIDING ITEMS OF INTEREST

(75) Inventors: Mayank Sachan, Seattle, WA (US); Peter Lai, Seattle, WA (US); David Glick, Seattle, WA (US)

(73) Assignee: AMAZON TECHNOLOGIES INC., Seattle, WA (US)

( * ) Notice: Subject to any disclaimer, the term of this patent is extended or adjusted under 35 U.S.C. 154(b) by 153 days.

(21) Appl. No.: 13/441,583

(22) Filed: Apr. 6, 2012

(51) Int. Cl.
*G06F 17/30* (2006.01)

(52) U.S. Cl.
CPC ..... *G06F 17/3071* (2013.01); *G06F 17/30864* (2013.01)

(58) Field of Classification Search
None
See application file for complete search history.

(56) References Cited

U.S. PATENT DOCUMENTS

| | | | |
|---|---|---|---|
| 6,708,174 B1 * | 3/2004 | Tenorio | |
| 7,003,515 B1 | 2/2006 | Glaser et al. | |
| 2007/0192314 A1 * | 8/2007 | Heggem | 707/5 |
| 2009/0248494 A1 * | 10/2009 | Hueter et al. | 705/10 |
| 2010/0318435 A1 * | 12/2010 | Ramanathan | G06Q 20/12 705/26.35 |
| 2012/0253992 A1 * | 10/2012 | Melcher | G06Q 10/087 705/27.2 |
| 2013/0054498 A1 * | 2/2013 | Shah et al. | 706/12 |
| 2013/0097180 A1 * | 4/2013 | Tseng | 707/748 |
| 2013/0211968 A1 * | 8/2013 | Patro | G06Q 30/06 705/27.1 |

* cited by examiner

*Primary Examiner* — Rehana Perveen
*Assistant Examiner* — Raheem Hoffler
(74) *Attorney, Agent, or Firm* — Knobbe, Martens, Olson & Bear, LLP

(57) ABSTRACT

A source-matching service may gather information from one or more interest resources, then process the information to generate a set of keywords corresponding to an item or type of item in which users of a network-based service may be interested. Optionally, the source-matching service may identify a source to provide an item described by the interest keywords through the network-based service, and offer the source the opportunity to provide the item described by the interest keywords through the network-based service.

28 Claims, 7 Drawing Sheets

PROVIDING ITEMS OF INTEREST

BACKGROUND

Generally described, computing devices and communication networks facilitate network-based commerce. For example, a user may employ his or her computing device to access a network-based service, such as a retail website, for the purchase of items and services (collectively and individually referred to as "items") such as music, books, and electronics, just to name a few. These items may be offered for purchase or "listed" on the network-based service. For example, a user may purchase a listed item directly from the network-based service. A user may also purchase a listed item from another source affiliated with the network-based service.

In some instances, a user may be interested in an item not offered by the network-based service or by any affiliated sources, also called an "unlisted" item. For example, the user may search for the item on the network-based service and its affiliated sources, but fail to find the item. Since the user could not find the item on the network-based service, he or she may seek another provider for the item, costing the network-based service and/or its affiliates a potential sale. In another example, the user may be interested in an item offered by the network-based service, but may deem the price too high or deem shipping to take an unacceptably long time, and may take his or her business elsewhere.

Adding unlisted items and/or unlisted sources to the network-based service may mitigate or prevent these outcomes, while advantageously providing users with more items from which to choose and/or lower prices for items. It may be challenging to determine which items interest users, however. For example, the network-based service may not have any purchase history data to determine which items may interest a user. Additionally, it may be difficult to select a source to provide unlisted items, as many sources may offer unlisted items for sale. The network-based service may bear an unacceptably high risk in offering an item through a new source without knowing which items to offer or without knowing which sources may offer interesting items.

BRIEF DESCRIPTION OF THE DRAWINGS

The foregoing aspects and many of the attendant advantages will become more readily appreciated as the same become better understood by reference to the following detailed description, when taken in conjunction with the accompanying drawings, wherein.

DETAILED DESCRIPTION

Figure 1:
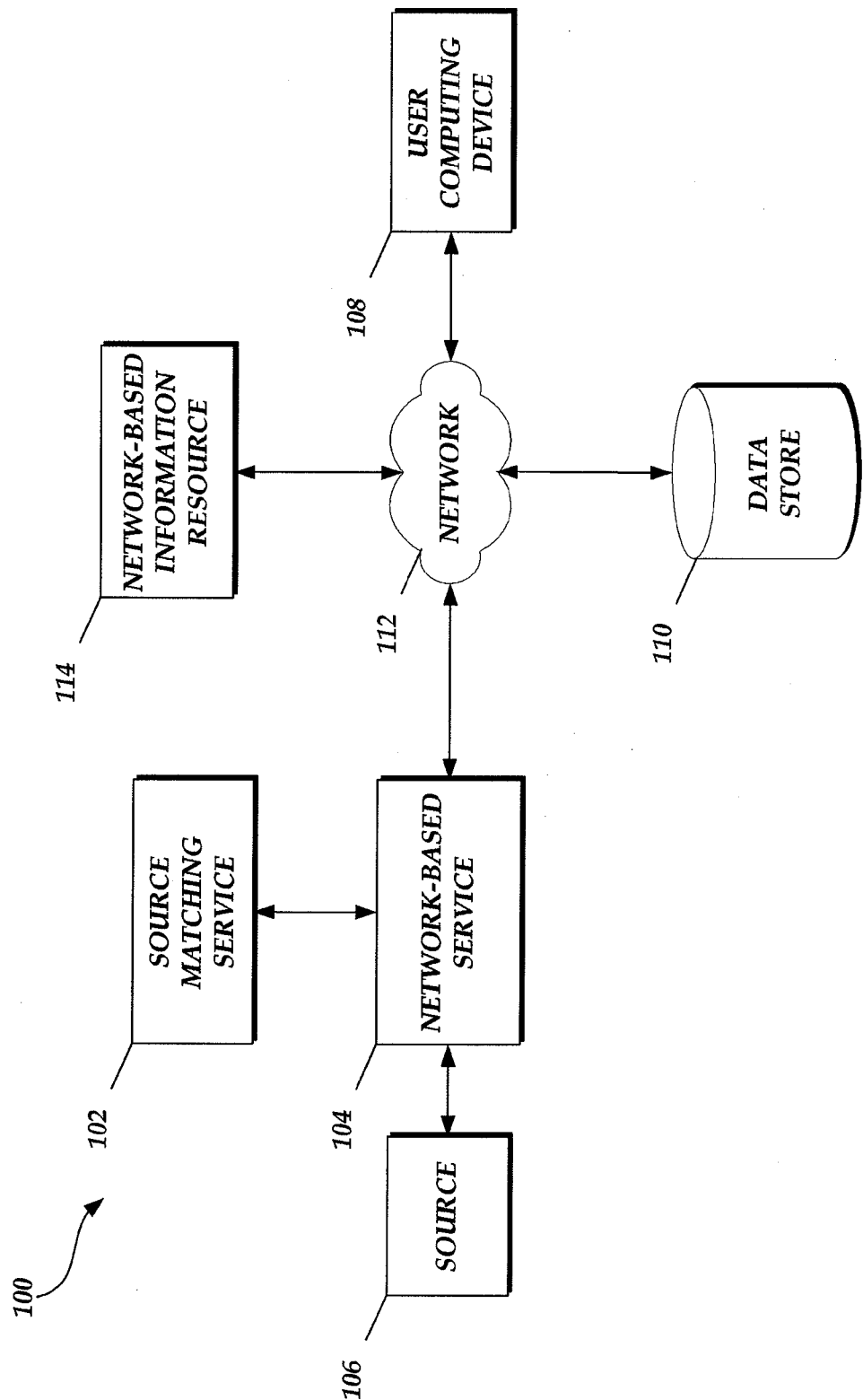
FIG. 1 is a block diagram of an illustrative network environment for matching sources to items of interest.

Generally described, aspects of the present disclosure relate to sourcing items of interest to be provided on a network-based service (e.g., a network-based retailer). In this regard, a source-matching service is described. The source-matching service may gather and process information regarding what items or types of items are of interest to users of the network-based service. This information may be processed into one or more interest keywords, which may be used to identify a prospective item or type of item to be provided over a network-based service. The source-matching service may also identify one or more sources that can provide an item corresponding to the interest keywords. Sources may include one or more of sellers or resellers that offer goods and/or services for sale, distributors of the goods and/or services, and producers of goods and/or services (e.g., manufacturers, service providers), etc. The source-matching service may also select a source and make an offer to the source to provide the item through the network-based service by becoming affiliated with the network-based service. The source may be also notified about a particular item or about the types of items in which consumers may be interested. For example, the source-matching service may transmit the interest keywords to the source.

Interest information may be obtained from what are herein referred to as "interest resources." Those of ordinary skill in the art will appreciate that interest information may come in one or more than one form, such as electronic data or print form. Those of ordinary skill in the art will also appreciate that interest information may be obtained or received from one or more than one interest resource. In some embodiments, interest information is obtained from interest resources that include network-based or electronic interest information. These interest resources may be local to the source-matching service, or they may be accessed by the source-matching service over an electronic network. Examples of electronic interest resources include data stores; network-based information resources, human interaction task systems, and network-based news or journalism services. Other examples of electronic interest resources include network-based communities, such as network-based services; network-based item registries such as wish lists; network-based social networking services; network-based social geographical services; network-based journaling communities; network-based micro-journaling communities, wherein users may post short journals or "tweets;" network-based reviewing services or communities, such as those that review or rank products, media, restaurants, or bars; network-based travel services; network-based content hosting communities; network-based content delivery platforms; network-based social news aggregators; and network-based social content aggregators.

In some embodiments, interest information is obtained from interest resources that include physical information (e.g., printed, visual, or auditory information). Such physical information resources may include audiobooks, musical albums, video content, books, catalogs, magazines, newspapers, photographs, letters, advertisements, and the like. In some embodiments, the source-matching service uses optical character recognition (OCR) to convert printed interest information into electronic interest information, by, for example, scanning a magazine that contains a product review.

In some embodiments, the source-matching service receives interest information from an interest resource including a user computing device. For example, a user may use his or her computing device to acquire information about a physical item. In one embodiment, the user uses his or her computing device to capture a digital image of an item in which he or she interested and submits it to the source-matching service over an electronic network. In another embodiment, the user submits interest information in the form of a search query to the source-matching service over an electronic network.

Interest information may be thought of as a collection of discrete descriptions of an item or type of item obtained from one or more interest resources. These descriptions are referred to herein as "interest indicators." Interest indicators may include, for example, a number of words or phrases describing an item or type of item of interest; a numeric or alphanumeric code for a prospective item of interest, such as a Universal Product Code (UPC) or standard identification number; a category for an item or type of item of interest (e.g., housewares, clothing, electronics); the name of the manufacturer, service provider, or brand for a potential item of interest; and so forth. Those skilled in the art will appreciate that items may be described in many ways, and that individuals or interest resources may describe interest about different items or types of items in different ways.

A few examples of types of items and possible interest indicators describing the item are as follows. These examples are intended to be illustrative and not limiting. For items such as music, the interest indicators may include the name of the performers and the genre of the music, among others. For items such as books, the interest indicators may include the name of the author; the title of the book; the book's International Standard Book Number (ISBN) or other identifying number; whether the book is part of a series; whether the book is in hardback, paperback, audiobook, or electronic form; the name of a character in the book; and the book's genre, among others. For items such as movies, the interest indicators may include the title of the movie; the name of the director; the names of the actors; what format the movie is in (such as DVD, Blu-Ray, or digital download); and the movie's genre, among other interest indicators. For items such as clothing, the interest indicators may include the size of the clothing; what type of clothing an item is (pants, shirt, shoes, etc.); the color of the clothing; the material of the clothing; the designer or label of the clothing; and so forth.

An example based on a specific item will be illustrative. A user may be interested in purchasing a blue lunchbox from the network-based service. Accordingly, the user may show his or her interest by, for example, entering one or more search terms into a search field of a content page hosted by the network-based service by using his or her computing device. In this example, the user may enter "blue lunchbox" into the search field. In one embodiment, the source-matching service may treat the entire string "blue lunchbox" as one interest indicator. In another embodiment, each search term is a separate indicator, such that "blue" is treated as one interest indicator and "lunchbox" is treated as another interest indicator.

The source-matching service may process the interest indicators that it obtains or receives in order to identify, for example, which interest indicators are the most frequent, prevalent, popular, important, or accurate. By determining these characteristics of the interest indicators, the source-matching service may advantageously be more likely to identify or predict items that actually interest users and prospective users of the network-based service, more likely to identify or predict items that may drive high sales volume or profits for the network-based service, and more likely to identify sources to provide these items over the network-based service.

In some embodiments, the source-matching service applies a set of rules to the interest indicators. Rules may include decisions on whether to accept or discard an interest indicator based on one or more characteristics of the interest indicator. For example, interest indicators may be part of a class (words, phrases, alphanumeric codes, etc.), correspond to a particular category of item (housewares, clothing, electronics, etc.), or come from a particular type of interest resource (network-based community, network-based service, physical information resource, etc.). Those skilled in the art will appreciate that one rule or more than one rule may be applied by the source-matching service as desired.

In some embodiments, the source-matching service may assign scores and/or weights to the interest indicators. It will be appreciated by those skilled in the art that scoring and/or weighting the interest indicators may be used in conjunction with or instead of the rules described above. The source-matching service may determine a weighted score for each interest indicator that it obtains or receives. As discussed in greater detail below, the interest indicators' weighted scores may be generated based upon characteristics of the interest indicators, the objectives of the source-matching service, or both.

The source-matching service may also filter the interest indicators it obtains from interest resources from further consideration. Generally, filtering may be used to improve the accuracy of the source-matching service in generating interest keywords. For example, spurious interest indicators or duplicate interest indicators may be removed from further consideration such that those interest indicators do not influence the generation of the set of interest keywords.

As discussed above, the source-matching service may process interest indicators by applying a set of rules to the interest indicators, scoring and/or weighting the interest indicators, and/or filtering the interest indicators. A final set including one or more interest keywords may be generated from the processed interest indicators. It should be appreciated that, like interest indicators, interest keywords may include words, phrases, or alphanumerical codes that provide a discrete description of one or more attributes of an item or type of item.

The source-matching service may also identify sources capable of providing an item that corresponds to the set of interest keywords. For example, the source-matching service may submit a search query to a network-based information resource, obtain as search results a list of potential sources, score the sources, filter the list of sources, and generate a list of sources for further consideration.

Working from the list of potential sources for further consideration, the source-matching service may then select a source to receive an offer to provide an item that corresponds to the interest keywords through the network-based service. In some embodiments, the source-matching service accesses information about a plurality of items and identifies an item that may correspond one, some, or all of the interest keywords, herein referred to as an "appropriate item." The item information accessed by the source-matching service may be physical or electronic in nature. In some embodiments, the item information is accessed by the source-matching service from an electronic data store or a network-based information resource. In other embodiments, the item information is received by the source-matching service from a potential source. For example, the potential source may provide information to the source-matching service about a candidate item that the source believes is an appropriate item. If the source-matching service determines that the candidate item is an appropriate item, then the item may be provided by the source through the network-based service.

The source-matching service may determine whether a potential source is already affiliated with the network-based service. If the potential source is already affiliated with the network-based service, the source-matching service may alert the potential source about the interest in the items and may invite the potential source to provide the appropriate item or items over the network-based service. The potential source may also (or instead) be notified about one or more of the interest keywords, such that the potential source may decide which item to offer over the network-based service.

If the potential source is not already affiliated with the network-based service, the source-matching service may obtain the contact information of the potential source. Additionally, if the potential source is not already affiliated with the network-based service, the source-matching service may only extend an offer to provide an appropriate item over the network-based service if the potential source already carries the appropriate item. In some embodiments, the source-matching service submits the interest keywords to the source, and allows the source to put forth a candidate item. The source-matching service may then determine if the candidate item suggested by the source is an appropriate item by comparing the candidate item to the interest keywords. If the candidate item matches one, some, or all of the interest keywords, it may be deemed an appropriate item.

Once a potential source that carries an appropriate item has been identified, the source-matching service may contact the identified potential source with an offer or invitation to provide the appropriate item on the network-based service. The contact may be delivered through mechanisms such as telephone calls, mail delivery, electronic mail messages, short message service (SMS) messages, messages sent over a social networking service, and so forth. In some embodiments, the source-matching service selects the mechanism for contacting a potential source based on the scores of the interest keywords that it generates. In other embodiments, the method of contact is based on the source's score. In embodiments where the source-matching service identifies an appropriate item on its own, the source-matching service selects the contact mechanism based on the score of the interest keywords associated with the appropriate item. This choice reflects the idea that particularly desirable potential sources, such as popular sources or sources that offer desirable items, may be more receptive to an offer that indicates a high level of attention from the source-matching service.

If the source accepts the offer, it may then provide an appropriate item through the network-based service. If the source declines the offer to become affiliated with the network-based service, it may be removed from further consideration by the source-matching service for a period of time or permanently.

With reference to FIG. 1, an illustrative operating environment 100 is shown, including a source-matching service 102 in communication with a network-based service 104 and one or more sources 106. In certain embodiments, the network-based service 104 may offer one or more items for sale, the items for sale being provided by network-based service 104 or provided by the sources 106 on the network-based service 104.

The source-matching service 102 may identify interest keywords corresponding to one or more items. These items may be offered by the network-based service 104, either directly through the network-based service 104 or through a source 106. The sources 106 may include one or more of sellers, resellers, distributors, manufacturer, and etc. The sources 106 may further include sources that already provide items on the network-based service 104 as well as sources that do not provide items on the network-based service 104. Sources 106 may be considered by the source-matching service 102 for providing items on the network-based service 104.

The source-matching service 102 may be in further communication with one or more data stores, represented by data store 110. The data store 110 may maintain information regarding items that are provided by a selected network-based service 104, as well as items that are provided on the network-based service by sources 106. The data store 110 may also maintain information regarding items that are not provided by the network-based service 104 or by the sources 106. It may be understood that data store 110 may include network-based storage capable of communicating with any component of the system 100 (e.g., source-matching service 102, network-based service 104, etc.) via a network 112. The data store 110 may further include storage that is in local communication with any component of the system 100.

The source-matching service 102 may identify items that correspond to the interest keywords that it generates. In certain embodiments, the source-matching service 102 retrieves information regarding items stored on data store 110. In certain embodiments, the source-matching service 102 performs an item search with the set of interest keywords using a network-based information resource 114 capable of receiving search queries and providing search results responsive to a received search query. Search results providing information about items that may correspond to the interest keywords may be returned to the source-matching service 102. Based on the information it obtains from the data store 110 and/or the search results, the source-matching service 102 may select an appropriate item that may be desired to be provided.

As noted above, appropriate items may be any good or service. Accordingly, an appropriate item may include objects (e.g., articles of manufacture, plants, animals, etc.), events (e.g., games, concerts, movies, etc.), and services (e.g., travel services, financial services, residential services, employment services, etc.).

The source-matching service 102 may also identify sources 106 capable of providing an item corresponding to the interest keywords and present offers to sources 106 to provide the selected item via the network-based service 104. In certain embodiments, the source-matching service 102 performs a sourcing search with the set of interest keywords using a network-based information resource 114 capable of receiving search queries and providing search results responsive to a received search query.

Search results, including one or more sources for an item corresponding to the interest keywords, may be returned to the source-matching service 102. In response to receipt of the search results, the source-matching service 102 may obtain information regarding the sources identified in the search results and generate a source score for each search result. The search results may be scored, weighted, and/or filtered to generate a list of potential sources 106 to provide an appropriate item. The source-matching service 102 may transmit one or more offers to the potential sources 106 inviting the potential sources 106 to provide an item corresponding to the interest keywords through the network-based service 104. In some embodiments, the source-matching service 102 notifies the potential sources 106 about an appropriate item identified by the source-matching service 102, where the offer is to provide the appropriate item. In other embodiments, the source-matching service 102 notifies the potential sources 106 about the interest keywords, and allows the potential sources 106 to select which particular item is to be provided over the network-based service. The source-matching service 102 may further process responses returned from the potential sources 106. Sources 106 agreeing to provide an item corresponding to the set of interest keywords on the network-based service 104 may be stored in the data store 110 and the item or items provided by the agreeing sources may be retrieved in response to user requests for information regarding items of interest from the network-based service 104.

The user computing device 108 may include any computing devices, such as a laptop or tablet computer, personal computer, personal digital assistant (PDA), hybrid PDA/mobile phone, mobile phone, electronic book reader, set-top box, camera, digital media player, and the like.

The network-based information resource 114 may include any computing device capable of receiving a query from the source identification service 102 and returning a response. Examples of network-based information resources 114 may include, but are not limited to, search engines, network-based auctions, network-based services, network-based business and/or service listings, and the like.

In one embodiment, the source-matching service 102 may communicate with the user computing device 108 and network-based information resource 114 via communication network 112, such as the Internet, or a communication link. Those skilled in the art will appreciate that the network 112 may be any wired network, wireless network or combination thereof. In addition, the network 112 may be a personal area network, local area network, wide area network, cable network, satellite network, cellular telephone network, or combination thereof. Protocols and components for communicating via the Internet or any of the other aforementioned types of communication networks are well known to those skilled in the art of computer communications and thus, need not be described in more detail herein.

It will be recognized that many of the components described below are optional and that embodiments of the environment 100 may or may not combine components. Furthermore, components need not be distinct or discrete. Components may also be reorganized in the environment 100. For example, the source-matching service 102 and the network-based service 104 may be represented in a single physical server or computing system containing all of the subsystems described below or, alternatively, may be split into multiple physical servers.

The source-matching service 102, user computing device 108, and network-based service 104 may each be embodied in a plurality of components, each executing an instance of the respective source-matching service 102, user computing device 108, and network-based service 104. A server or other computing system implementing the source-matching service 102, user computing device 108, and network-based service 104 may include a network interface, memory, processing unit, and computer readable medium drive, all of which may communicate with each other by way of a communication bus. Moreover, a processing unit may itself be referred to as a computing device. The network interface may provide connectivity over the network 112 and/or other networks or computer systems. The processing unit may communicate to and from memory containing program instructions that the processing unit executes in order to operate the source-matching service 102, user computing device 108, and network-based service 104. The memory generally includes RAM, ROM, and/or other persistent and/or auxiliary memory.

Figure 2:
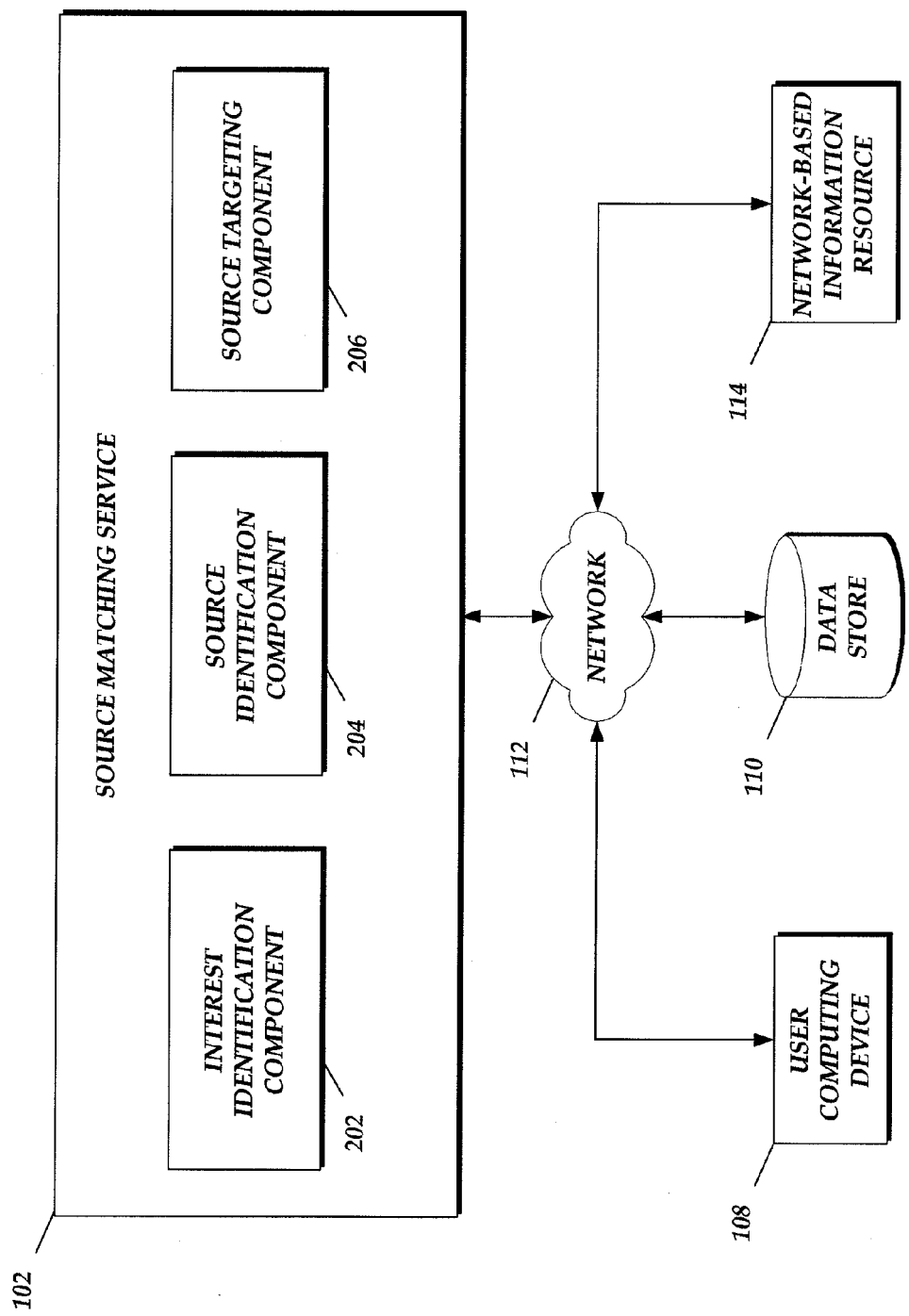
FIG. 2 is a block diagram depicting illustrative components of a source-matching server.

FIG. 2 depicts illustrative components of the source-matching service 102. The source-matching service 102 may include an interest identification component 202, a source identification component 204, and a source-targeting component 206. Those skilled in the art will appreciate that these components may be embodied in a single computing device, such as a server, or split between multiple computing devices. These components may be in communication with one another. Additionally, in some embodiments, the components can each individually communicate over the network 112 with a user computing device 108, a data store 110, and/or a network-based information resource 114. Additionally, it should be appreciated that while the data store 110 is shown in FIG. 2 as being remote from the source-matching service 102, in some embodiments, the data store 110 is local to the source-matching service 102.

Generally described, the interest identification component 202 may obtain and process interest information from one or more interest resources. The interest identification component 202 may also produce a set of interest keywords as output. The source identification component 204 may identify one or more sources that may provide items that correspond to the interest keywords. The source-targeting component 206 may identify an appropriate item based on the interest keywords and may also identify a source to which to extend an offer to provide the appropriate item through the network-based service.

For ease of reference, illustrative process flows that may be carried out by each component are discussed separately below. An illustrative process carried out by the interest identification component 202 is discussed below with respect to FIG. 4. An illustrative process carried out by the source identification component 204 is discussed below with respect to FIG. 5. An illustrative process carried out by the source-targeting component 206 is discussed below with respect to FIG. 6 and FIG. 7.

Figure 3:
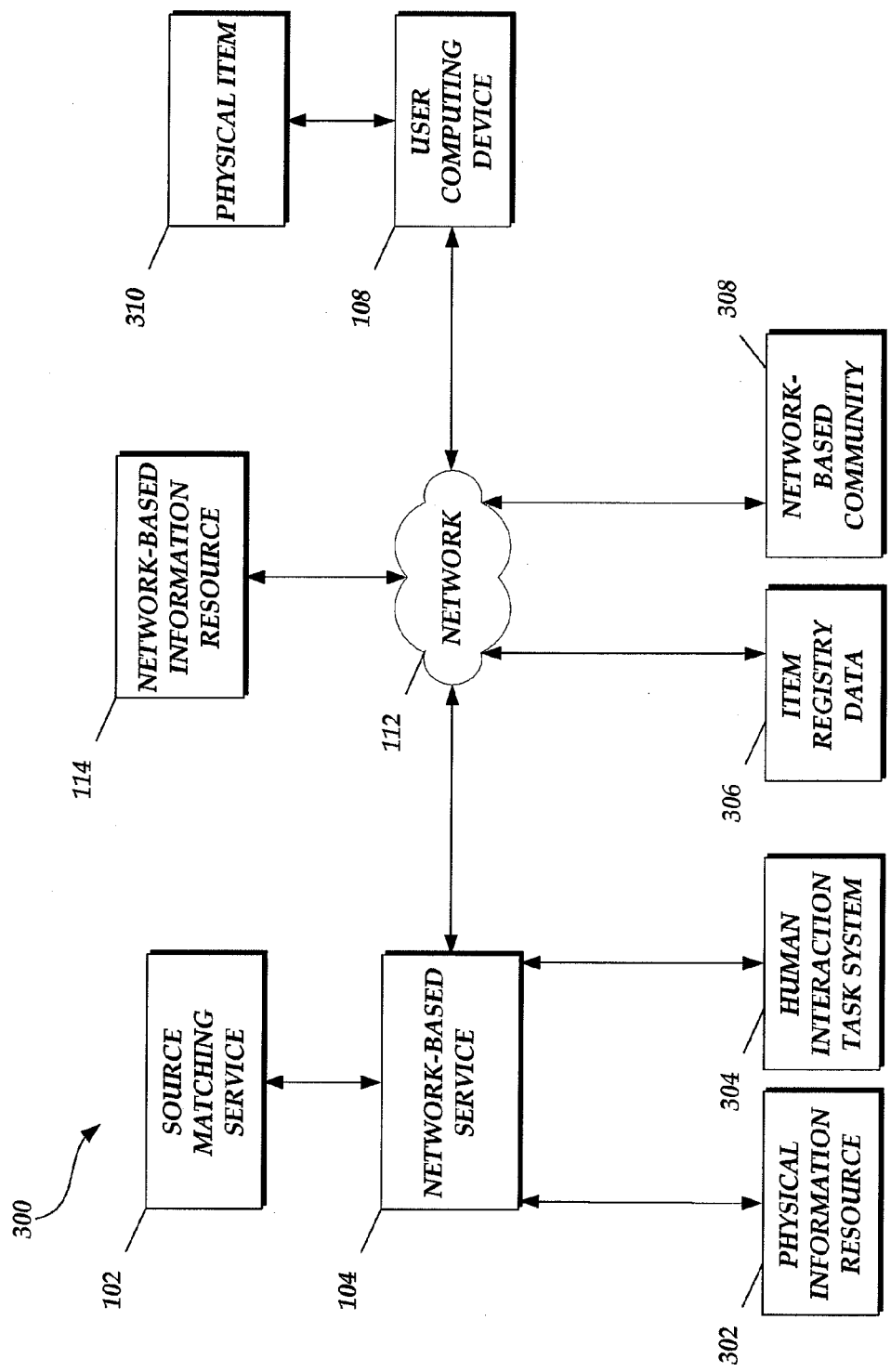
FIG. 3 is a block diagram of an illustrative network environment that includes several illustrative types of interest resources.

FIG. 3 depicts an illustrative network environment 300 including several different types of interest resources. As discussed above, the source-matching service 102 may be in communication with a network-based service 104. In turn, the network-based service 104 may be in communication with one or more local interest resources and/or one or more interest resources remote to the network-based service 104. The source-matching service 102 may access these remote interest resources through the network-based service 104 over the network 112. In other embodiments, the source-matching service 102 may communicate directly over the network 112.

The network-based service 104 may itself be an interest resource. The source-matching service 102 may access and parse interest information maintained by the network-based service 104 to obtain one or more interest indicators from the network-based service 104. Alternately, the network-based service 104 may generate, flag, or otherwise identify several different types of interest indicators to be obtained by the source-matching service 102. Some of these interest indicators may be based on requests sent by one or more user computing devices 108. For example, a user may enter one or more search terms into a search field of a content page hosted by the network-based service 104 by using his or her user computing device 108. Alternately, the user may user his or her user computing device to enter search terms into a browser toolbar to search for a particular item or type of item. These search terms may prompt the network-based service 104 to generate one or more search results corresponding to individual items. If the user does not purchase any of the items listed in the search results, the network-based service 104 may flag the search terms as an interest indicator, reflecting the concern that the user has not found a satisfactory item related to those search terms.

In a similar way, a user may request detailed information about an item from the network-based service 104 by using his or her computing device 108. If the user does not purchase the item, the network-based service 104 may flag the information describing that item as including one or more interest indicators, reflecting the concern that the user may have found a satisfactory item, but not at a satisfactory price or not from a satisfactory source affiliated with the network-based service. The network-based service 104 may also generate one or more interest indicators based on purchase histories. For example, the network-based service 104 may aggregate purchase histories, then predict a number of interest indicators corresponding to likely subsequent purchases. For example, if many individuals have recently purchased skis from the network-based service 104, the network-based service 104 may predict that ski boots are likely to attract interest as well, and may flag "ski boots" as an interest indicator to be obtained by the source-matching service 102.

The network-based service 104 may generate interest indicators in other ways as well. For example, the network-based service 104 may identify an item that it provides that has several negative reviews. Users of the network-based service 104 may be interested in purchasing a similar item, but one without negative reviews. Accordingly, the network-based service 104 may generate one or more interest indicators that correspond to the item or the type of the item in order to identify a similar item to be provided. For example, a particular model or brand of skis offered by the network-based service 104 may have received many negative user reviews. Nonetheless, it may be desirable for the network-based service 104 to provide or offer to provide skis. The network-based service 104 may generate "skis" as an interest indicator so that the source-matching service 102 may seek out another source for skis or another type of skis to offer.

Likewise, a particular source affiliated with the network-based service 104 may have received many negative user reviews. Users of the network-based service 104 may be interested in purchasing items similar to or identical to the items offered by the negatively-reviewed source, but may not wish to do business with the affiliated source because of the negative reviews. Thus, it may be desirable for the network-based service 104 to provide or offer to provide items similar to those offered by the negatively-reviewed source, or to find another source for those items. Accordingly, the network-based service 104 may generate one or more interest indicators that correspond to negatively-reviewed source's inventory in order to find one or more items to be provided by a new source.

The network-based service 104 may also generate interest indicators based on the financial performance of an item. For example, the network-based service 104 may identify an item that it offers whose financial performance is sub-optimal (e.g., the network-based service 104 may be losing money by offering to provide the item). It may be desirable for the source-matching service 102 to locate another source for the item so that the item can be offered without financial detriment to the network-based service 104. For example, if the network-based service 104 is losing money by providing or offering to provide skis (perhaps due to inventory costs, transaction costs in finding suppliers, shipping costs, etc.), the network-based service 104 may flag "skis" as an interest indicator so that the source-matching service 102 may seek out another source that can provide skis in a cost-effective manner (e.g., a specialized ski manufacturer that could provide the item over the network-based service).

Network-based advertisements (such as "ad words," or words advertising an item) may also be identified by the network-based service 104 as an interest indicator. For example, the network-based service 104 may identify that many users are accessing the network-based service 104 by following network links corresponding to ad words, such as a hyperlink on a content page on the network 112. These popular ad words could be flagged as interest indicators by the network-based service 104.

The network-based service 104 may generate one or more interest indicators based on the input of an expert. For example, the network-based service 104 may employ one or more experts in a particular type of item, or may solicit input from a user of the network-based service 104 who is an expert in a particular type of item. These experts could generate a list of interest indicators based on the type of item in which they have expertise. For example, an expert in science fiction literature might identify several popular science fiction authors, literary characters, settings, series, and the like. The names of the authors, characters, series, and settings could be flagged as interest indicators to be obtained by the source-matching service 102.

The source-matching service 102 may access an interest resource in the form of a physical information resource 302. As discussed above, physical information resources may include many different types of information embodied in audiobooks, musical albums, video content, books, catalogs, magazines, newspapers, photographs, letters, advertisements, and the like. In addition to descriptions of items, the information included in a physical information resource could include rankings of items (such as a sales chart for musical albums); news stories about items, reviews of items, requests for the network-based service 104 to provide an item, and so forth. In some embodiments, printed information from a physical information resource 302 is scanned by using OCR technology in order to generate electronic text. The source-matching service 102 may then obtain one or more interest indicators from the electronic text generated. In other embodiments, the source-matching service 102 may obtain one or more images from the physical information resources, and then analyze the image using techniques known in the art to identify the item or type of item. An example of item identification based on image analysis is described in U.S. Pat. No. 7,949,191, entitled "METHOD AND SYSTEM FOR SEARCHING FOR INFORMATION ON A NETWORK IN RESPONSE TO AN IMAGE QUERY SENT BY A USER FROM A MOBILE COMMUNICATIONS DEVICE" and issued May 24, 2011, which is incorporated herein by reference in its entirety.

The source-matching service 102 may also obtain interest indicators from a human interaction task system 304. Generally described, the human interaction task system 304 is a computerized system, including one or more computing devices, that electronically processes human interaction tasks (HITs). A HIT may be a difficult, time-consuming, or expensive task for a computing device to perform. However, it might be relatively easy and quick for a human to perform a HIT. Accordingly, the human interaction task system 304 might request a human operator to perform a HIT, e.g., for gathering information or answering a query, and to return the results or answers to the human interaction task system 304 for further processing and/or presentation to the requestor. Thus, in some embodiments, the source-matching service 102 directs the human interaction task system 304 to pose one or more queries about interest to a human operator of the human interaction task system 304. The human operator of the human interaction task system 304 may volunteer to answer these queries and provide information about items that might interest the human operator or others; information about seasonal trends, fashion trends, or the popularity of an item or type of item; information about the activities or hobbies enjoyed by the human operator or others; demographic information of the human operator or others; and so forth. The human interaction task system 304 may then store these answers as interest indicators, which may be later obtained by the source-matching system 102.

The source-matching service 102 may also obtain information from interest resources over a network 112. In one embodiment, the source-matching service 102 obtains interest indicators from one or more item registries 306. Item registries 306 may include publicly available wish lists, electronic catalogs, gift registries, and the like. Interest indicators may be identified and obtained from publicly available item registries 306 by, for example, using network content scraping techniques known in the art. A user of an item registry 306 may also submit a list of items on their registry to the source-matching service 102. Additionally, the network-based service 104 may host an item registry 306 from which the source-matching service 102 may obtain interest indicators.

The source-matching service 102 may obtain interest information from a network-based community 308. In various embodiments, the source-matching service 102 identifies and obtains interest indicators from publicly available data that users may submit to the network-based community 308. In one embodiment, the source-matching service 102 identifies interest indicators based on public expressions of interest in an item submitted to the network-based community 308 (for example, a publicly available post in which a user indicates that he or she "likes" an item). In another embodiment, the source-matching service 102 identifies interest indicators based on trends in expressions of interest in an item. For example, for a network-based community 308 that includes a micro-journaling community, many users of the micro-journaling community may post short journals expressing interest in an item during a predetermined time span. The name of the item or other attributes of the item may be obtained from the network-based community 308 and processed as an interest indicator by the source-matching service 102. In a further embodiment, the source-matching service 102 obtains interest indicators from a network-based community 308 that includes a network-based social news aggregator or a network-based social content aggregator. If many users of the network-based community 308 post news or content regarding an item or type of item, the source-matching service may recognize these posts as containing interest indicators, and obtain those interest indicators from the network-based community 308. For example, many users of a network-based social content aggregator may post content about a forthcoming video game. The source-matching service 102 may analyze the posted content, using, for example, content scraping techniques or named entity extraction. Interest indicators may be obtained from the content based on details such as the name of the video game, names of characters in the video game, which platforms (console, portable device, personal computer, etc.) can run the video game, and so forth.

The source-matching service 102 may obtain interest information from a network-based information resource 114 as well. The network-based information resource 114 may include a search field in which a user of a user computing device 108 may input one or more search terms. The network-based information resource 114 may aggregate the search terms input by a plurality of users in order to identify popular search terms or search terms that are part of a trend. The source-matching service 102 may obtain these search terms from the network-based information resource 114 and treat them as interest indicators.

The source-matching service 102 may additionally obtain interest information from a user computing device 108. As discussed above, the user of a user computing device 108 may submit interest information to the network-based service 104 in the form of one or more search terms, which may then be obtained from the network-based service 104 by the source-matching service 102. In another embodiment, the user of a user computing device 108 that includes an image capture device captures an image of a physical item 310 and submits it to the source-matching service 102. The source-matching service 102 may then submit the image to the human interaction task system 304 and direct a human operator to identify one or more interest indicators based on the image of the physical item 310. The source-matching service 102 may then obtain the interest indicators identified by the human operator from the human interaction task system 304. More information on the use of human interaction task systems to analyze images of items may be found in U.S. Patent Pub. No. 2009/0182622, entitled "ENHANCING AND STORING DATA FOR RECALL AND USE," filed on Aug. 28, 2008, and incorporated herein by reference in its entirety.

Those skilled in the art will appreciate that FIG. 3 is not an exhaustive list of the types of interest resources from which interest indicators may be obtained by the source-matching service 102. For example, interest resources may also be embodied in one or more data stores that may be local to source-matching service 102 or remote from source-matching service 102 and accessed over a network 112. Still other types of interest resources, not shown, may have interest indicators which may be obtained by the source-matching service 102.

Figure 4:
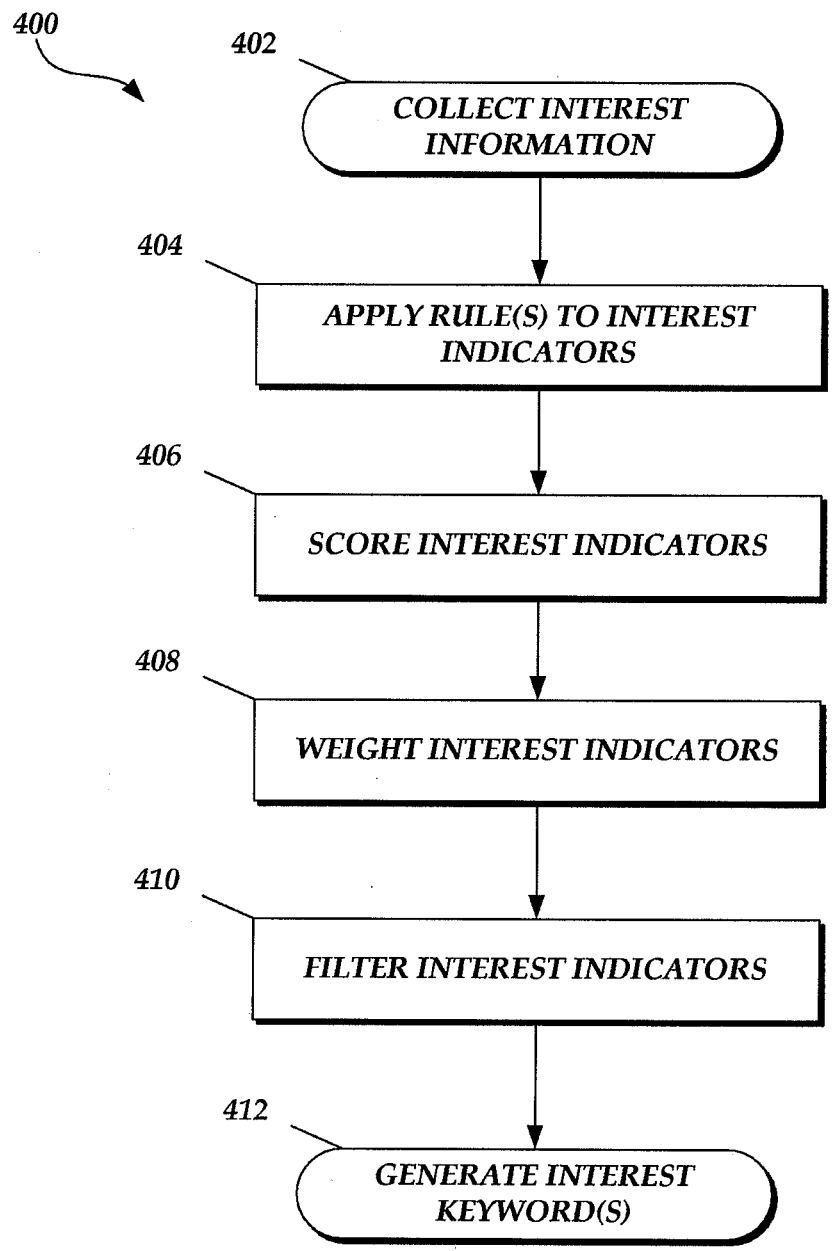
FIG. 4 is a flowchart depicting an illustrative process for generating a set of interest keywords that may be used to identify items of interest.

Returning to FIG. 2, by obtaining interest information from one or more interest resources, the interest identification component 202 may generate a set of interest keywords to guide the selection of an item to be provided over the network-based service 104, whether the item is to be provided directly by the network-based service 104 or through a source 106. FIG. 4 depicts an illustrative process flow 400 that may be carried out by the interest identification component 202 in order to generate a set of interest keywords.

In block 402, interest information is obtained from one or more interest resources. This interest information may include a plurality of interest indicators. As discussed above, these interest indicators may come from any number of interest resources or any type of interest resource. In some embodiments, the interest information is broken down into interest indicators by the interest resource. The source-matching service may then obtain these interest indicators directly from the interest resource. For example, a network-based service may aggregate one or more searches performed by one or more users of the network-based service. The search terms may be processed into interest indicators by the network-based service and obtained by the source-matching service. In other embodiments, the source-matching service may analyze unprocessed interest information from an interest resource and may process it to obtain one or more interest indicators. The interest information may be processed by content scraping, named entity extraction, or other content analysis techniques known in the art.

In block 404, the source-matching service may apply one or more of a set of rules to the interest information that it obtains. Generally speaking, rules may be used to determine which interest indicators merit further consideration by the source-matching service. The source-matching service may apply one or more rules so that certain interest indicators are accepted for further consideration, while other interest indicators are discarded and removed from further consideration. These rules may be based on one or more of the characteristics of the interest indicator, such as the class, type, or category of the interest indicator, as described above. A number of example rules are described herein. In one embodiment, the source-matching service applies a rule to discard all interest indicators except for those belonging to a particular category. For example, the source-matching service may consider only interest indicators corresponding to books, and discard all other interest indicators. In another embodiment, the source-matching service applies a rule to discard all interest indicators except for those obtained from a particular interest resource, a particular type of interest resources, or a particular set of interest resources. For example, the source-matching service may consider only interest indicators that were obtained from network-based services, and discard all other interest indicators. In yet another embodiment, the source-matching service applies a rule to accept only those interest indicators corresponding to a particular class of interest indicator, such as only accepting UPC codes or ISBN codes and discarding all of the other interest indicators. In a still further embodiment, the source-matching service selects a first interest indicator and, using clustering algorithms known in the art, accepts one or more interest indicators clustered with the first interest indicator before discarding all of the other interest indicators. For example, for a first interest indicator corresponding to a set of skis, the source-matching service may accept interest indicators corresponding to items closely clustered with skis, such as ski boots, ski masks, and ski goggles, and discard interest indicators corresponding that may correspond items not closely clustered with skis, such as surfboards. Those skilled in the art will appreciate that any number of rules based on any characteristic of an interest indicator may be employed. Additionally, rules may be applied sequentially or concurrently. For example, the source-matching service may determine that an interest indicator must satisfy at least three rules of a set of five rules to be considered further.

In block 406, the interest indicators may be scored. The score of an interest indicator may be determined by a variety of factors, referred to herein as interest parameters. Scores for an interest indicator may include ratings based on a characteristic of the interest indicator.

In one embodiment, the interest parameters include a type rating of an interest resource from which an interest indicator is obtained. The type rating may reflect the fact that some types of interest resources are more likely to produce interest indicators that accurately predict or reflect interest in an item or type of item. For example, interest indicators obtained from network-based item registries such as wish lists may very accurately predict or reflect interest in an item or type of item, whereas interest indicators obtained from social networking services may be less accurate. Accordingly, interest indicators obtained from network-based item registries may have a higher type rating than interest indicators obtained from social networking services.

In another embodiment, the interest parameters include a credibility rating of an interest resource from which an interest indicator is obtained. The credibility of an interest resource may be determined by how reliably a particular interest resource produces interest indicators that accurately predict or reflect interest in an item or type of item. For example, some interest resources may be deemed more credible than other interest resources. Accordingly, an interest indicator obtained from one interest resource may have a higher credibility rating than an interest indicator obtained from another interest resource. The credibility rating for any given interest resource may be evaluated and revised by the source-matching service from time to time. For example, the source-matching service may determine that a particular interest resource has produced exceptionally credible interest indicators over a period of time. Accordingly, the credibility rating of that interest resource may be increased by the source-matching service. The source-matching service may also place new interest resources on a "probationary" period by assigning those interest resources a low initial credibility rating. It may be understood that any number of interest parameters may be employed without limit for scoring the interest indicators, and that the interest parameters may be transformed in any number of ways.

In block 408, an interest indicator's score may be weighted (e.g., the score may be multiplied by a weight) based on any of a number of factors. In one embodiment, the weight assigned to an interest indicator includes a frequency rating of that interest indicator. The frequency rating may reflect, for example, how many identical interest indicators are obtained by the source-matching service in a given time period. For example, if the source-matching service obtains 10,000 interest indicators for footballs and only 1,000 interest indicators for basketballs, the source-matching service may assign a higher frequency rating to the interest indicators for footballs. In another embodiment, the weight assigned to an interest indicator includes a priority rating of a category affiliated with that interest indicator. The priority rating may be increased if the network-based service will significantly benefit from providing items that may correspond to a category of that interest indicator. For example, the network-based service may significantly benefit from providing items that belong to a particular category of items in which the network-based service specializes. In another example, the network-based service may significantly benefit from providing items that belong to a particular category of items that the network-based service does not provide, but would like to provide through an affiliated source. In a further embodiment, the weight assigned to an interest indicator includes a financial rating of a category affiliated with that interest indicator. For example, the financial rating of an interest indicator may be increased if the network-based service has enjoyed financial success in providing items in the interest indicator's category, and decreased if the network-based service has had financial difficulty in providing items in the interest indicator's category. It will be appreciated by those skilled in the art that weights may be selected for any characteristic of an interest indicator, and that more than one weight may be used. For example, an interest indicator could be weighted by multiplying its score by the sum of 60% of the interest indicator's popularity rating and 40% of the interest indicator's priority rating, i.e., Weighted Score=Score×(0.6*Popularity Rating+ 0.4*Priority Rating)

It will be appreciated by those skilled in the art that the source-matching service may apply one or more rules to the interest indicators, may score and weight the interest indicators, or may both apply one or more rules and score and weight the interest indicators.

In block 410, the source-matching service may filter the set of interest indicators. As discussed above, filtering may be performed to discard interest indicators that may not lead to the generation of accurate or desirable interest keywords. In one embodiment, filtering may include discarding certain interest indicators that correspond to previously generated interest keywords. In this manner, the same interest keywords may not be generated more than once in a given time frame, for example, within the same week, month, season, or year. In another embodiment, filtering may include discarding duplicate interest indicators obtained from the same interest resource, such as multiple short journal entries including the same interest indicator being posted by the same user of a network-based micro-journaling community. In a further embodiment, filtering may include discarding interest indicators that may correspond to spurious interest. For example, the source-matching service may determine that an ephemeral network-based cultural phenomenon (for example, a "meme" or a short-journaling "trend") occurring on one or more interest resources may produce many interest indicators but very little actual interest in an item.

In block 412, the source-matching service may generate a set of one or more interest keywords based on the interest indicators. As discussed above, it should be appreciated that interest keywords may include words, phrases, or alphanumeric codes. In one embodiment, the set of interest keywords includes a filtered list of interest indicators that satisfy one or more rules of a set of rules applied by the source-matching service. In another embodiment, the set of interest keywords includes all interest indicators with a score or a weighted score above a threshold value. In a further embodiment, the set of interest keywords includes all interest indicators whose weighted scores are above a certain percentile for all of the weighted and scored interest indicators. For example, the source-matching service may select for the set of interest keywords only those interest indicators having weighted scores in the top quartile or top half of all of the interest indicators under consideration. In yet a further embodiment, the set of interest keywords includes only a top number of interest indicators. For example, the source-matching service may select for the set of interest keywords only those interest indicators having the top five scores or top ten scores of all of the interest indicators under consideration.

As discussed above, in some embodiments, the set of interest keywords includes one or more of the interest indicators obtained by the source-matching service. For example, if the source-matching service obtains the interest indicator "blue lunchbox" from an interest resource, the phrase "blue lunchbox" or the words "blue" and "lunchbox" may be included in the set of interest keywords. In other embodiments, the set of interest keywords includes words, phrases, or alphanumeric codes that do not necessarily appear in the plurality of interest indicators. Rather, these words, phrases, or alphanumeric codes may be predicted or inferred from one or more interest indicators. For example, for the interest indicators "Mickey Mantle," "Honus Wagner," and "Ty Cobb" (baseball players), one interest keyword could be "vintage baseball cards," as all three of those baseball players appear in famous vintage baseball cards. These predictions and inferences may be made by using clustering algorithms, named entity extraction, or other analytic techniques known in the art.

In some embodiments, the source-matching service limits the size of the set of interest keywords to minimize the computational power or network bandwidth needed, for example, to identify an appropriate item or to select a source to receive an offer to provide an item through the network-based service.

Figure 5:
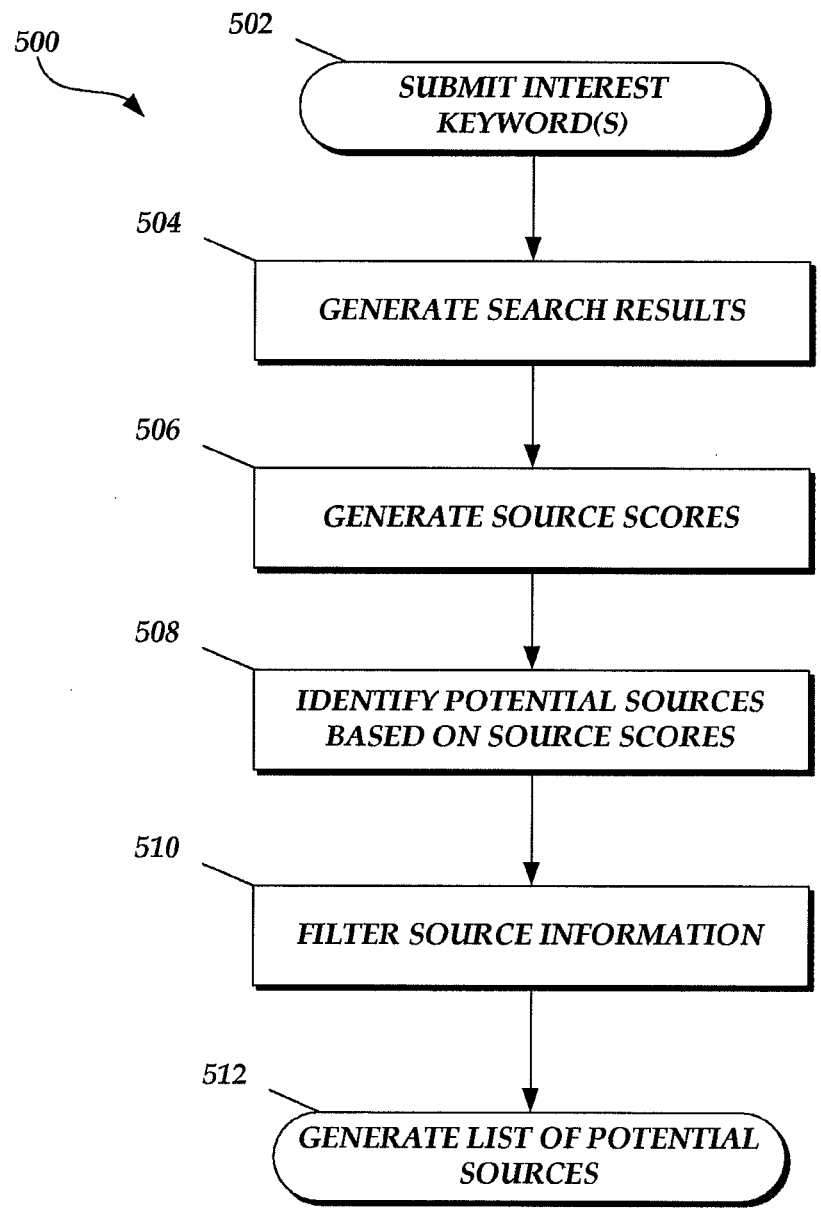
FIG. 5 is a flowchart depicting an illustrative process for generating a list of potential sources for items of interest.

Returning to FIG. 2, with the interest keywords generated by the interest identification component 202, the source identification component 204 of the source-matching service 102 may identify a source corresponding to the interest keywords. Advantageously, the source-matching service 102 may locate a source that deals in the types of items described by the interest keywords so that a specific item corresponding to the interest keywords may be offered over the network-based service. FIG. 5 depicts an illustrative process flow 500 that may be carried out by the source identification component 204 to identify one or more potential sources to provide an item through the network-based service.

In block 502, the interest keywords generated by the interest identification component may be submitted one or more resources that may be able to identify a source. In one embodiment, sources are identified by submitting a search to a network-based information resource using the set of interest keywords. This search may be referred to herein as a sourcing search. Examples of network-based information resources may include, but are not limited to, search engines, network-based auctions, network-based retailers, and network-based business and/or service listings. In another embodiment, sources are identified by submitting the interest keywords to a human interaction task system. An operator of the human interaction task system may be requested to identify one or more sources that correspond to the set of interest keywords.

In block 504, results returned from the sourcing search and/or from the human interaction task system may be provided to the source-matching service for further processing. These results may include a list of sources, which may further include Uniform Resource Locators (URLs) for respective sources.

In block 506, the source-matching service may determine a score for each source returned in response to the sourcing search. As discussed in greater detail below, the source scores may be generated based upon selected parameters pertaining to the respective returned sources, referred to herein as sourcing parameters. In one embodiment, the sourcing parameters may include a measurement of the relative importance of the returned source, as established by a selected network-based information resource (e.g., a search engine). This sourcing parameter may be referred to herein as a source rank. In another embodiment, the sourcing parameters may include an estimate of the number of the items offered for sale by the returned source. This sourcing parameter may be referred to herein as a SKU estimate. In a further embodiment, the sourcing parameters may include an estimate of the number of users employing the returned source (e.g., the number of viewers requesting web pages hosted by the URL of the returned source). This sourcing parameter may be referred to herein as a source utilization estimate. In an additional embodiment, the sourcing parameters may include a normalized frequency at which the returned source appears in the sourcing search. This sourcing parameter may be referred to herein as a query rank. In a further embodiment, the sourcing parameters may include a measure of the desirability of the payment mechanism requested by the source. In an additional embodiment, the sourcing parameters may include a measure of the desirability of the category in which the source is classified. In yet another embodiment, the sourcing parameters may include a measure of customer satisfaction with a source, such as a "star rating." The measure of customer satisfaction may be maintained by, for example, a network-based information resource that aggregates or hosts reviews of one or more potential sources. In an additional embodiment, the sourcing parameters may include a financial indicator of a source, such as a source's gross sales or net profits over a given time period. It may be understood that any number of sourcing parameters may be employed without limit for generating the source score, and that the sourcing parameters may be transformed in any number of ways. For example, a source score may include a weighted average of several sourcing parameters, with different weights assigned to each sourcing parameter.

In block 508, the source-matching service may identify a list of one or more sources for further consideration based on the scores of the sources. In an embodiment, the list of potential sources includes all sources with a score above a threshold value. In another embodiment, the list of sources includes only those sources whose scores are above a certain percentile for all of the scored and/or filtered sources. For example, the source-matching service may select only those sources having scores in the top quartile or top half of all of the sources under consideration. In yet a further embodiment, the list of sources for further consideration includes only a top number of sources. For example, the source-matching service may select only those sources having the top five scores or top ten scores of all of the sources under consideration.

In block 510, the source-matching service may filter sources appearing in the search results from further consideration. In one embodiment, filtering may include removing sources that are repeated (e.g., same source name and/or source contact information). In this manner, the same source may not be considered more than once. In another embodiment, filtering may include removing sources that have previously refused an offer from the source-matching service to provide items on the network-based service. As discussed in greater detail below, sources that have refused an offer from the source-matching service within a selected duration of time may be removed from further consideration by the source-matching service. In an additional embodiment, sources may be removed based upon selected biographic information of the source (e.g., geographic location of the source, currency accepted by the potential source). Such filtering of the sources may reflect a determination that sellers outside a selected geographic region may present undesired logistical challenges in delivery of the items corresponding to the interest keywords (e.g., time and/or added shipping costs for potential sources based in another country, currency fluctuations). In additional embodiments, sources may be removed from consideration based upon a determination that they are not commercial sellers (e.g., e-commerce retailers). This determination may reflect a desire to solicit sources which are businesses offering appropriate items in volume, not individuals selling singular goods.

In block 512, a list of potential sources is generated. In an embodiment, this list is a filtered list of the highest-scoring sources as determined in block 508 and block 510. In another embodiment, only part of the filtered list of the highest-scoring sources are deemed potential sources. For example, the source-matching service may limit the size of the list of potential sources to reduce the computational power or network bandwidth needed to select a source to receive an offer to provide an appropriate item through the network-based service. In some embodiments, the list of potential sources generated is stored by a data store. The source-matching service may retrieve the list of potential sources for later use.

Figure 6:
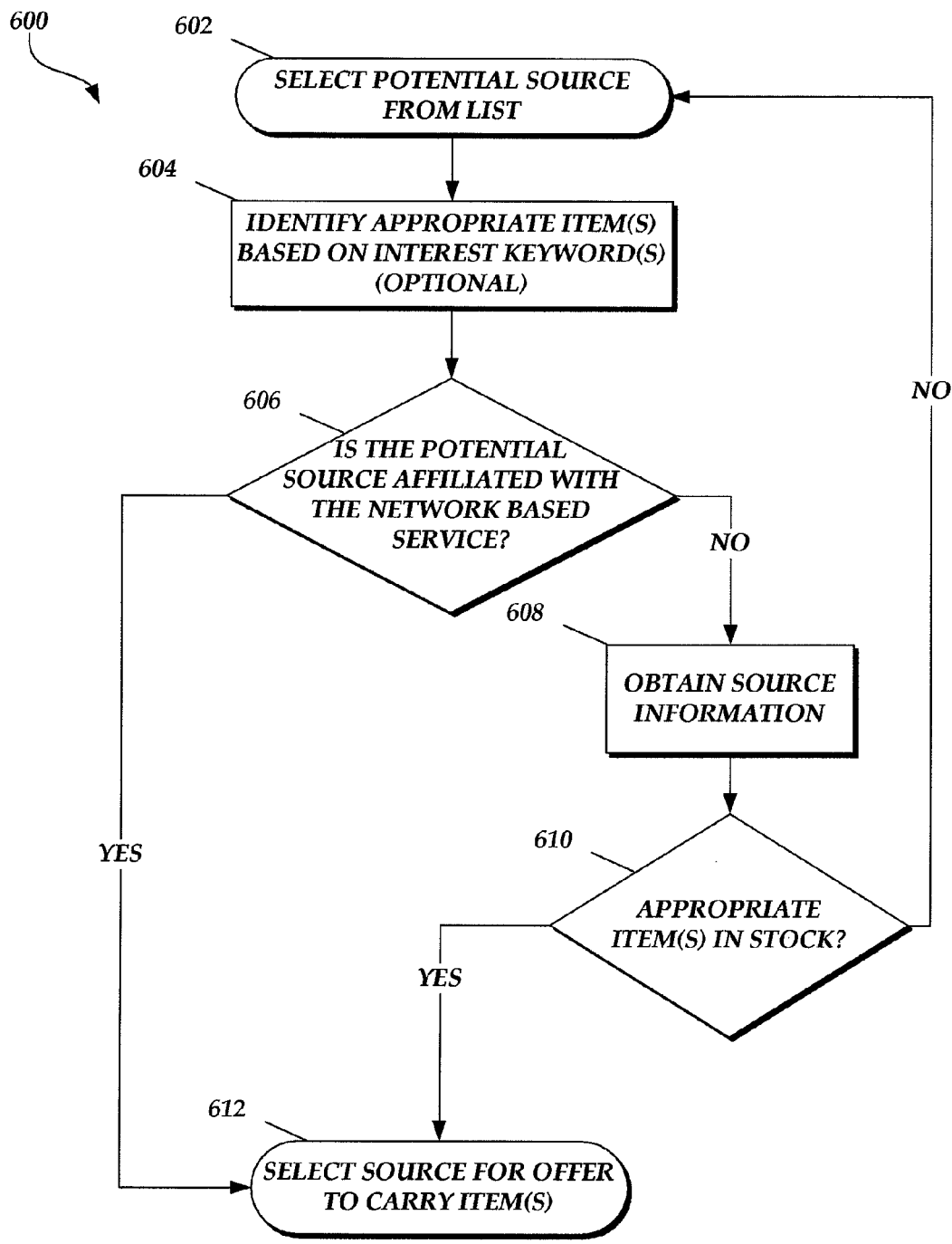
FIG. 6 is a flowchart depicting an illustrative process in which one or more sources from the list of potential sources are selected for receiving an offer to become affiliated with a network-based service and/or to carry an item.

Returning to FIG. 2, with the interest keywords generated by the interest identification component 202 and the list of potential sources generated by the source identification component 204, the source-targeting component 206 may identify a source to receive an offer to provide an item over the network based service. FIG. 6 depicts an illustrative process flow 600 that may be carried out by the source-targeting component 206 to identify one or more potential sources to provide an item through the network-based service.

In block 602, a potential source is selected from a list of potential sources. In some embodiments, the list of potential sources is generated contemporaneously with the source-matching service's execution of illustrative process flow 600. In other embodiments, the source-matching service may retrieve a list of potential sources stored on a data store.

In block 604, an appropriate item may be identified based on the interest keywords. To identify an item corresponding to the set of interest keywords, the source-matching service may access and analyze information on a plurality of items. The information may describe items carried by the network-based service or its affiliate sources, items not carried by the network-based service or its affiliate sources, or both. As with interest indicators, an item's information may include, for example, a number of words or phrases describing each item; a numeric or alphanumeric code for each item, such as a Universal Product Code (UPC); a category for each item; the name of the manufacturer, service provider, or brand for each item; and so forth. Those skilled in the art will appreciate that items may be described in many ways and that different types of items may be described in different ways, such that the types of information available about an item may vary from one item to the next.

Information about items may be in physical form (such as on a printed page) or in electronic form (such as on a content page or a "Web page," or as information stored in the memory of a computer or data store). In one embodiment, the source-matching service accesses a data store containing electronic information on a plurality of items. In another embodiment, the source-matching service may obtain information on a plurality of items by submitting the interest keywords to a network-based information resource, which may then return search results corresponding to a plurality of items. In still another embodiment, the source-matching service may obtain information on a plurality of items by analyzing a potential source's inventory as shown on one or more content pages maintained by the potential source. For example, the source-matching service may employ content scraping or named entity extraction techniques known in the art to acquire information about items described in content pages. In yet a further embodiment, the source-matching service may acquire information about items from one or more physical information resources. For example, a physical catalog could be converted into electronic data by using optical character recognition (OCR) techniques known in the art. The source-matching service may then access and analyze the electronic data.

The source-matching service may then examine the items about which information has been retrieved in order to identify items that may interest the users (or potential users) of a network-based service. As discussed above, a set of interest keywords is generated by the source-matching service based on information received from various interest resources. By determining how closely an item corresponds to the generated set of interest keywords, the source-matching service can identify an appropriate item. In one embodiment, the source-matching service determines the number of interest keywords to which an item corresponds. If that number exceeds a threshold number, the source-matching service deems the item an appropriate item. In another embodiment, the source-matching service determines the number of interest keywords to which an item corresponds, and divides that number by the total number of interest keywords in the set. If that ratio exceeds a threshold value, the source-matching service deems the item an appropriate item. In still another embodiment, the source-matching service uses a weighted approach. For example, the source-matching service may determine that one keyword from the set is twice as important as another keyword from the set. The source-matching service may then generate a weighted matching score for an item, and compare that score to a threshold value to determine whether the item is an appropriate item. In yet another embodiment, the source-matching service deems an item appropriate only if that item matches all of the interest keywords in the set.

The source-matching service may rely in part or entirely on a human interaction task system to identify an appropriate item. In an embodiment, the source-matching service submits the set of interest keywords and information about one or more items to the human interaction task system. A human operator of the human interaction task system may be asked to parse the information about the items to determine which items correspond to the interest keywords. In another embodiment, the source-matching service submits the set of interest keywords to the human interaction task system, but does not submit any other information. For example, a human operator of the human interaction task system may be asked to provide the source-matching service with information about one or more items that correspond to the interest keywords.

The source-matching service may determine whether the selected potential source is affiliated with the network-based service as shown in block 606. Whether the selected potential source is affiliated with the network-based service may be determined by analyzing content pages hosted by the network-based service, or by analyzing the network-based service's records. Other ways of determining a source's affiliation are possible, as will be appreciated by those skilled in the art. As shown in block 612, if the selected potential source is affiliated with the network-based service, the source-matching service may extend an offer to the source to provide the appropriate item over the network-based service.

If the selected potential source is not affiliated with the network-based service, the source-matching service may obtain further information about the source in block 608. Information that may be obtained about the selected potential source may include contact information pertaining to the potential source, such as a postal address, phone number, electronic mail address, Uniform Resource Locator address, and the names of the source's decision makers. The information gathered may also include information about the potential source's inventory. For example, for a potential source that maintains one or more content pages on a network that advertise items in its inventory, the source-matching service may use content scraping techniques known in the art to determine what items are carried by the potential source. The source-matching service may also employ one or more operators of a human interaction task system to obtain the contact information or inventory information of a source.

In block 610, the source-matching service may determine whether the selected potential source has an appropriate item in stock or is capable of providing an appropriate item. As discussed above, one or more appropriate items may be determined by analyzing a list of items obtained by the source-matching service and comparing them to the set of interest keywords generated by the interest identification component. In some embodiments, the source-matching service selects an appropriate item as may be identified in block 604, and analyzes the potential source's inventory to determine if that source carries an appropriate item.

In some embodiments, the source-matching service does not itself identify an appropriate item. Instead, the source-matching service may allow a source to select an appropriate item from its inventory. In this respect, the source-matching service may advantageously rely on the discretion, expertise, or experience of the potential source to select an appropriate item. Thus, in one embodiment, in block 610, the source-matching service submits a notification or query that includes the interest keywords to the potential source to determine if the source has an appropriate item in stock. This notification or query may be in a form such as, "Do you carry an item that corresponds to the following keywords? The keywords are 'skis,' 'goggles,' and 'hats.'" The source may then respond affirmatively by identifying in its inventory a candidate item that the source believes corresponds to the interest keywords. By analyzing information pertaining to the candidate item, the source-matching service may determine whether the candidate item put forth by the source is an appropriate item. Whether the candidate item is an appropriate item may be determined by how closely the candidate item corresponds to the interest keywords, as discussed above with respect to block 604. For example, the candidate item may only be deemed an appropriate item if it conforms to a certain number or percentage of interest keywords in the set of interest keywords. In another embodiment, the source-matching service simply transmits some or all of the set of interest keywords to the potential source, without engaging in the candidate item/appropriate item inquiry, giving the potential source wider discretion in selecting an appropriate item. For example, the source-matching service may not require a potential source to select a candidate item to be approved as an appropriate item by the source-matching service.

If the source responds to the query with an inappropriate item, responds to the query negatively, or fails to respond at all, the source may be deemed to lack any appropriate items. If the potential source does not carry an appropriate item, the source-matching service may return to block 602 and select another potential source to consider. In another embodiment, if the potential source does not carry an appropriate item, the potential source may nonetheless be invited to provide an appropriate item over the network-based service.

If the potential source does carry an appropriate item, it may be selected for an offer to provide the appropriate item over the network-based service, as shown in block 612. If the potential source accepts the offer, the appropriate item may be provided by the source through the network-based service.

It may be desirable for the source-matching service to set different conditions for providing items over a network-based service based on a source's prior affiliation with the network-based service. For example, because a source affiliated with the network-based service is a known quantity to the network-based service, the source-matching service may provide a source affiliated with the network-based service the right of first refusal to provide an appropriate item over the network-based service. This choice may reflect the concern that selecting new sources to carry an appropriate item may carry some risk of the unknown, and that the network-based service would bear that risk. For example, the network-based service may not have any customer satisfaction information regarding a new source. The choice to favor affiliated sources by the source-matching service may also reflect a desire to reward a particularly loyal, profitable, or well-liked source affiliated with the network-based service.

Figure 7:
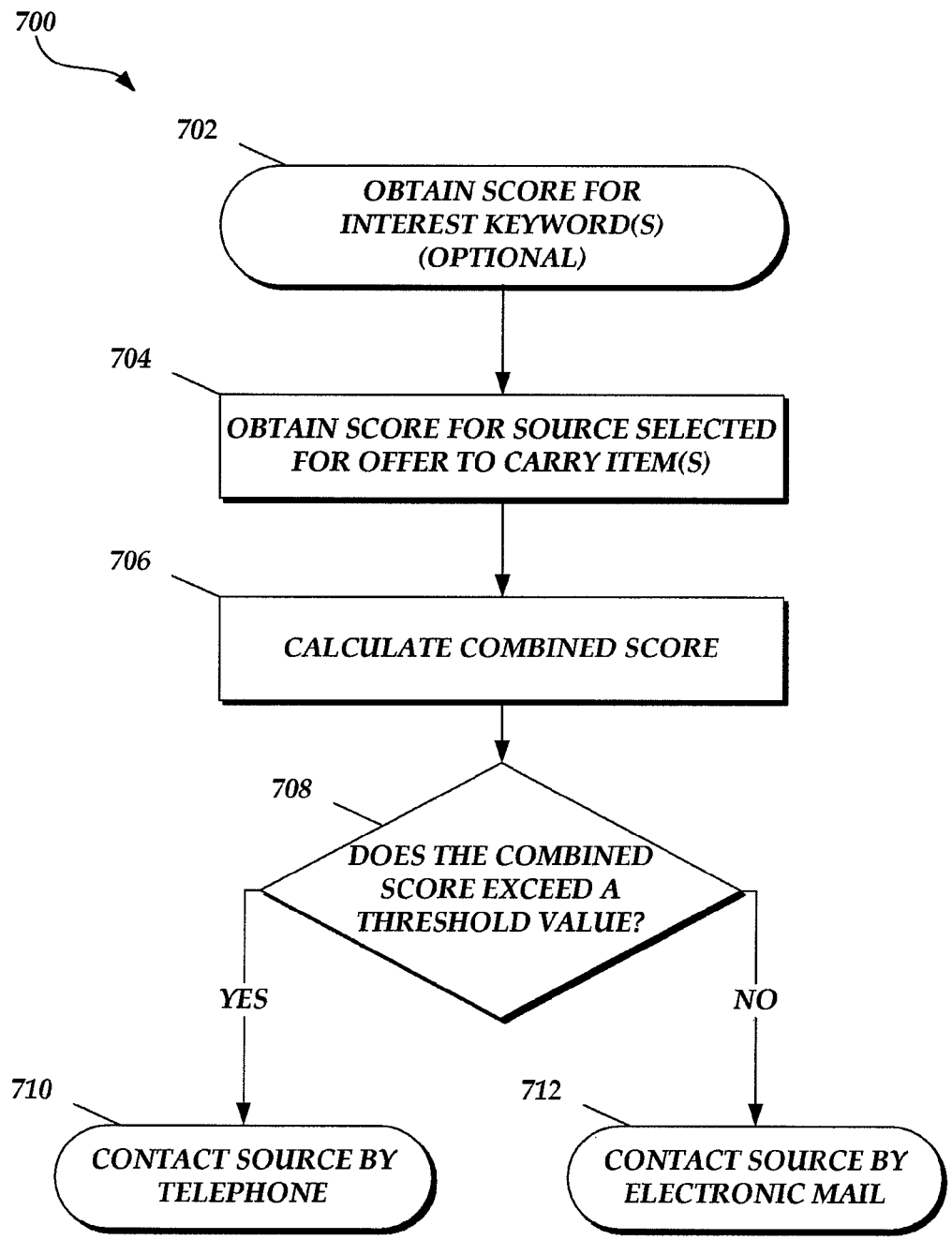
FIG. 7 is a flowchart depicting an illustrative process for determining how to contact a source with an offer to provide an item through a network-based service.

The source-matching service may determine how to contact the source with an invitation to provide an appropriate item through the network-based service based on a number of factors. FIG. 7 depicts an illustrative process flow 700 by which the source-matching service may communicate an offer to provide an appropriate item over the network-based service. In block 702, the source-matching service may determine the score of the interest keywords generated by the interest identification component. As discussed above, in some embodiments, the set of interest keywords may include one or more interest indicators. These interest indicators may be scored and/or weighted. Accordingly, an interest keyword that is also an interest indicator may be assigned a keyword score equal to the weighted score of the interest indicator. Rules may also (or instead) be applied to the interest indicators. Accordingly, an interest keyword that is also an interest indicator may be assigned a keyword score based on how many rules of a set of rules the interest indicator satisfies, for example.

In embodiments where the source-matching service predicts one or more interest keywords that are not also interest indicators, the keyword score for the predicted interest keyword may be, for example, the average score of the interest indicators that prompted the source-matching service to predict that interest keyword. For example, the "Honus Wagner" interest indicator may have an interest indicator score of 10, while the "Mickey Mantle" and "Ty Cobb" interest indicators may interest indicator scores of 9 and 5, respectively. Accordingly, the predicted interest keyword "vintage baseball cards" may have a score of 8, the average of 10, 9, and 5. Other ways of assigning a score to a predicted interest keyword may be used. For example, the source-matching service may assign to a predicted interest keyword the lowest score of an interest indicator used to predict that interest keyword. Returning to the above example, the score of the interest keyword "vintage baseball cards" would be 5 using this methodology, as "Ty Cobb" had the lowest interest indicator score, 5, of the interest indicators used to make the prediction.

The keyword scores for each interest keyword may be summed, averaged, etc. to determine a final keyword score in block 702. However, those skilled in the art will appreciate that block 702 may also simply be omitted from the illustrative process flow 700, such that only source scores are examined.

In block 704, the source-matching service may obtain the score of the source selected for an offer to provide an appropriate item, as discussed above with respect to FIG. 5. As discussed above with respect to FIG. 6, the source-matching service may favor sources already affiliated with the network-based service, and may want to provide those sources with greater attention. Accordingly, the score of the source selected for the offer may optionally be augmented if the source is already affiliated with the network-based service, for example, by multiplying the source's score by a factor of 2.

In block 706, the source-matching service may compute a combined score for the scores obtained in blocks 702 and 704. The combined score may be the arithmetic sum of the keyword score from block 702 and the source score in block 704. The combined score may be a weighted sum of the scores as well. Still other methods for calculating a combined score are possible.

In block 708, the source-matching service may compare the combined score to one or more thresholds in order to select a means of communicating an offer to the source. In one embodiment, if this combined score is above a certain threshold, the source-matching service contacts the potential source with a telephone call, as shown in block 710. If this combined score is below a certain threshold, the source-matching service contacts the potential source by electronic mail, as shown in block 712. Those skilled in the art will appreciate that threshold values and mechanisms for contacting a potential source with an offer may be varied as desired. Additionally, multiple thresholds may be set. In another embodiment, the source-matching service generates a combined interest indicator and source score as described above. The source-matching service may then compare that combined score to two threshold values, one higher threshold and one lower threshold. If the combined score is above the higher threshold, the source-matching service may contact the potential source with a telephone call. If the combined score is above the lower threshold, but below the higher threshold, the source-matching service may contact the potential source by electronic mail. If the combined score is below the lower threshold, the source-matching service may contact the potential source by postal delivery or "snail mail."

Upon receiving a response from a potential source, or determining that no response is forthcoming from a potential source, the source-matching service may process the response. In an example, an affirmative response from a selected source to the offer may result in one or more appropriate items being provided on the network-based service from the selected source. In another example, a negative response or lack of a response to the offer from the selected source may result in the selected source being removed from consideration by the source-matching service for further offers for a selected time period.

Embodiments of the source-matching service have been discussed above in a retail environment for illustrative purposes. Those skilled in the art will appreciate that non-retail embodiments are within the spirit of the present disclosure as well. The source-matching service may be employed in environments where items are not sold, but rather are borrowed, rented, discussed, reviewed, loaned, exchanged, auctioned, shared, donated, traded, bartered, etc. For example, the source-matching service may be used in conjunction with a network-based service that enables users to barter goods or services. Users may express an interest in one item or type of item corresponding to a set of interest keywords while indicating that they are a source of another item or type of item corresponding to another set of interest keywords, for example. Other applications of the source-matching service are also possible.

All of the methods and processes described above may be embodied in, and fully automated via, software code modules executed by one or more general purpose computers or processors. The code modules may be stored in any type of computer-readable medium or other computer storage device. Some or all of the methods may alternatively be embodied in specialized computer hardware.

Conditional language such as, among others, "can," "could," "might" or "may," unless specifically stated otherwise, are otherwise understood within the context as used in general to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

Conjunctive language such as the phrase "at least one of X, Y and Z," unless specifically stated otherwise, is otherwise understood with the context as used in general to convey that an item, term, etc. may be either X, Y or Z. Thus, such conjunctive language is not generally intended to imply that certain embodiments require at least one of X, at least one of Y, and at least one of Z to each be present.

Any process descriptions, elements or blocks in the flow diagrams described herein and/or depicted in the attached figures should be understood as potentially representing modules, segments, or portions of code which include one or more executable instructions for implementing specific logical functions or elements in the process. Alternate implementations are included within the scope of the embodiments described herein in which elements or functions may be deleted, executed out of order from that shown, or discussed, including substantially concurrently or in reverse order, depending on the functionality involved as would be understood by those skilled in the art. For example, those skilled in the art will appreciate that the source-matching service may first identify an appropriate item and then search for potential sources that carry the appropriate item, as opposed to performing a search with the generated set of interest keywords. Those skilled in the art will also appreciate that in some embodiments, the source-matching service does not identify an appropriate item based on the interest keywords. Instead, the source-matching service may transmit an invitation or offer to a potential source that simply notifies the potential source of the interest keywords. In this way, the source-matching service may rely on the discretion or expertise of the potential source to select an appropriate item.

It should be emphasized that many variations and modifications may be made to the above-described embodiments, the elements of which are to be understood as being among other acceptable examples. All such modifications and variations are intended to be included herein within the scope of this disclosure and protected by the following claims.

The invention claimed is:

1. A system for matching sources with interest, the system comprising:
   a computing device comprising a processor, the processor configured to execute computer-readable instructions that configure the processor to at least:
   obtain a plurality of interest indicators from one or more interest resources, each interest indicator describing an item;
   generate a set of interest keywords based at least in part on the plurality of interest indicators;
   identify the item based, at least in part, on the set of interest keywords;
   submit a search request comprising the set of interest keywords to a network-based information resource, the search request configured to identify item sources that offer the item for sale;
   obtain, from the network-based information resource, search results comprising one or more item sources offering the item for sale that correspond to the set of interest keywords;
   for individual item sources of the one or more item sources, determine a score associated with the item source, wherein the score is based, at least in part, on at least one sourcing parameter associated with the item source, wherein the at least one sourcing parameter identifies an estimated number of users employing the item source;
   identify, from the search results, an item source of the one or more item sources capable of providing the item for sale based, at least in part, on the determined score associated with the item source;
   determine that the identified item source has the item in stock; and
   in response to determining that the identified item source has the item in stock, transmit an offer to the identified item source, the offer comprising an invitation to provide the item for sale through a network-based service; and
   an electronic data store in communication with the computing device, wherein the electronic data store is configured to store interest keywords generated by the computing device.

2. The system of claim 1, wherein at least one interest indicator describes an item by type.

3. The system of claim 1, wherein the computing device is further configured to at least:
   determine that an interest indicator is identical to an interest keyword stored in the data store; and
   in response to determining that the interest indicator is identical to the interest keyword stored in the electronic data store, discard the interest indicator from the plurality of interest indicators;
   wherein the discarded interest indicator is not used by the computing device to generate the set of interest keywords.

4. The system of claim 1, wherein the network-based information resource comprises a human interaction task system.

5. The system of claim 1, wherein the computing device is further configured to at least:
   determine that an item source of the search results is not affiliated with the network-based service; and
   in response to determining that the item source is not affiliated with the network-based service, invite the item source to become affiliated with the network-based service.

6. The system of claim 1, wherein the computing device is further configured to at least predict an interest keyword based at least in part on at least one interest indicator.

7. The system of claim 1, wherein the set of interest keywords comprises at least one interest keyword identical to an interest indicator.

8. The system of claim 1, wherein the sourcing parameter is at least one of a source rank, a SKU estimate, a source utilization estimate, a query rank, a measure of customer satisfaction associated with the source, or a financial indicator associated with the source.

9. The system of claim 1, wherein the at least one sourcing parameter includes an indication of sales over a defined time period.

10. A computer-implemented method for matching sources to interest, the computer-implemented method comprising:
as implemented by one or more computing devices configured with specific executable instructions:
obtaining, from at least one interest resource, a plurality of interest indicators that describe an item;
determining a score for at least one interest indicator based at least in part on information regarding the at least one interest resource;
determining a weight for the at least one interest indicator based at least in part on a rating associated with the at least one interest indicator;
generating a weighted score for the at least one interest indicator based at least in part on the score and the weight for the at least one interest indicator;
generating, from at least one interest indicator having a weighted score above a threshold value, a set of interest keywords;
submitting, to a network-based information resource, a search query to identify sources that offer the item for acquisition, the search query comprising the set of interest keywords;
receiving, from the network-based information resource, search results comprising one or more sources corresponding to at least one interest keyword of the set of interest keywords;
for individual sources of the one or more sources, determining a score associated with the source that offers the item for acquisition, wherein the score is based, at least in part, on at least one sourcing parameter associated with the source, wherein the at least one sourcing parameter identifies an estimated number of users employing the item source;
selecting a source from the one or more sources that is capable of providing the item for acquisition based, at least in part, on the determined score associated with the source; and
determining that the identified source has the item in stock;
in response to determining that the selected source has the item in stock, transmitting, to the selected source, an invitation to become affiliated with a network-based service.

11. The computer-implemented method of claim 10, wherein the information regarding the at least one interest resource is at least one of a type of an interest resource from which the at least one interest indicator is obtained and a credibility of an interest resource from which the at least one interest indicator is obtained.

12. The computer-implemented method of claim 10, wherein the rating associated with the at least one interest indicator is at least one of a financial rating of a category corresponding to the at least one interest indicator, a priority rating of a category corresponding to the at least one interest indicator, or a frequency rating corresponding to the at least one interest indicator.

13. The computer-implemented method of claim 10, wherein at least one interest resource comprises at least one of a physical information resource, a human interaction task system, an item registry, a social networking service, a network-based information resource, or a user computing device.

14. The computer-implemented method of claim 13, wherein the physical information resource comprises at least one of an audiobook, a musical album, an item of video content, a book, a catalog, a magazine, a newspaper, a photograph, a letter, or an advertisement.

15. The computer-implemented method of claim 10, wherein at least one interest indicator comprises a search term entered by a user into a search field of a content page hosted by the network-based service.

16. The computer-implemented method of claim 10, wherein the set of interest keywords comprises at least one interest keyword that is identical to an interest indicator.

17. The computer-implemented method of claim 10, wherein the set of interest keywords further comprises at least one interest keyword inferred from at least one interest indicator.

18. The computer-implemented method of claim 10, wherein the invitation comprises a notification of the set of interest keywords.

19. A non-transitory computer-readable medium having a computer-executable component for source matching, the computer-executable component comprising:
a source-matching component configured to at least:
obtain, from an interest resource, a plurality of interest indicators, each interest indicator describing an item;
accept, based at least in part on one or more rules, at least one interest indicator of the plurality of interest indicators;
generate a set of interest keywords, the set of interest keywords being based at least in part on the at least one accepted interest indicator;
submit a search query comprising at least one interest keyword of the set of interest keywords to a network-based information resource, the search query configured to identify item sources that offer the item for acquisition;
obtain, from the network-based information resource in response to the search query, a set of search results corresponding to one or more sources offering the item for acquisition;
for individual sources of the one or more sources,
determine a score associated with the source, wherein the score is based, at least in part, on a sourcing parameter associated with the source, wherein the at least one sourcing parameter identifies an estimated number of users employing the item source;
determine that the source has the item in stock;
determine that the score associated with the source satisfies a threshold value; and
in response to determining that the score associated with the source satisfies the threshold value and that the source has the item in stock, transmit an invitation to the source to become affiliated with a network-based service.

20. The non-transitory computer-readable medium of claim 19, wherein the source-matching component is further configured to at least discard, based at least in part on the one or more rules, at least one interest indicator.

21. The non-transitory computer-readable medium of claim 20, wherein the source-matching component is further configured to at least discard the at least one interest indicator in a response to a determination that:

the at least one interest indicator corresponds to spurious interest;

the at least one interest indicator is a duplicate of another interest indicator obtained from an interest resource from which the at least one interest indicator was obtained; or the at least one interest indicator is identical to an interest keyword previously generated by the source-matching component within a predetermined time period.

22. The non-transitory computer-readable medium of claim 20, wherein the one or more rules include at least one of:

accepting all interest indicators that belong to a selected category and discarding all other interest indicators;

accepting all interest indicators obtained from a selected interest resource and discarding all other interest indicators;

accepting all interest indicators obtained from a selected type of interest resource and discarding all other interest indicators;

accepting all interest indicators that comprise alphanumeric or numeric product codes and discarding all other interest indicators; or accepting a first interest indicator and all interest indicators clustered with the first interest indicator and discarding all other interest indicators.

23. The non-transitory computer-readable medium of claim 19, wherein the source-matching component is further configured to at least obtain information on a plurality of items from at least one of a network-based information resource and a data store.

24. The non-transitory computer-readable medium of claim 23, wherein the source-matching component is further configured to at least select an appropriate item corresponding to at least one of the interest keywords from the plurality of items.

25. The non-transitory computer-readable medium of claim 24, wherein the selection of an appropriate item is based at least in part on input from a human interaction task system.

26. The non-transitory computer-readable medium of claim 24, wherein the source-matching component is further configured to at least transmit, to the one or more sources, an offer to provide the selected appropriate item through a network-based service.

27. The non-transitory computer-readable medium of claim 19, wherein the source-matching component is further configured to at least remove a source from the one or more sources in response to a determination that:

the source prefers payment for items of interest in a currency different than that of a network-based service;

the source is not a network-based e-commerce source; or the source has a consumer satisfaction rating below a threshold value.

28. The non-transitory computer-readable medium of claim 19, wherein the source-matching component is further configured to at least:

transmit, to the one or more sources, a request for information describing a candidate item capable of being provided over a network-based service by the one or more sources;

receive information describing the candidate item from at least one source of the one or more sources;

determine, from the information received from the at least one source, that the candidate item is an appropriate item; and in response to determining that the candidate item is an appropriate item, transmit an offer to the at least one source inviting the at least one source to provide the candidate item through the network-based service;

wherein a candidate item is determined to be an appropriate item based at least in part on the candidate item corresponding to at least one of the interest keywords of the set of interest keywords.

* * * * *